United States Patent
Nakamura et al.

(10) Patent No.: US 7,370,475 B2
(45) Date of Patent: May 13, 2008

(54) TRAVELING HYDRAULIC WORKING MACHINE

(75) Inventors: Tsuyoshi Nakamura, Ibaraki-ken (JP); Kazunori Nakamura, Tsuchiura (JP); Toichi Hirata, Ushiku (JP); Genroku Sugiyama, Ryuugasaki (JP); Kentaro Itoga, Abiko (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 291 days.

(21) Appl. No.: 10/543,920
(22) PCT Filed: Nov. 15, 2004
(86) PCT No.: PCT/JP2004/016925
  § 371 (c)(1),
  (2), (4) Date: Aug. 1, 2005
(87) PCT Pub. No.: WO2005/052372
  PCT Pub. Date: Jun. 9, 2005

(65) Prior Publication Data
  US 2006/0201147 A1  Sep. 14, 2006

(30) Foreign Application Priority Data
  Nov. 26, 2003 (JP) ............... 2003-396098

(51) Int. Cl.
  *F16D 31/02* (2006.01)
(52) U.S. Cl. ............... 60/449
(58) Field of Classification Search ......... 60/431, 60/449
  See application file for complete search history.

(56) References Cited

U.S. PATENT DOCUMENTS

| 4,523,892 A | * | 6/1985 | Mitchell et al. | ............ 60/431 |
| 5,787,787 A | | 8/1998 | Kim et al. | |
| 7,225,615 B2 | * | 6/2007 | Bankestad et al. | ............ 60/431 |

FOREIGN PATENT DOCUMENTS

| JP | 9-317652 | 12/1997 |
| JP | 2968558 | 8/1999 |
| JP | 2000-73812 | 3/2000 |

* cited by examiner

*Primary Examiner*—F. Daniel Lopez
(74) *Attorney, Agent, or Firm*—Mattingly, Stanger, Malur & Brundidge, PC

(57) ABSTRACT

A modification torque ΔT and a torque converter speed ratio e is computed from input and output revolution speeds of a torque converter 31. A first determination coefficient α corresponding to the speed ratio e, and a second determination coefficient β corresponding to a pump pressure are computed. A selector 87 selects the smaller one of these coefficients as a determination coefficient γ, and the modification torque ΔT is multiplied by γ to provide a modification torque ΔTA. An adder 89 adds the modification torque ΔTA (negative value) to a pump base torque TR to provide a modified pump base torque TRA, whereby a maximum pump absorption torque TRA is controlled so as to become TRA. The maximum pump torque reducing control can then be performed while accurately confirming a work situation during the combined operation of travel and a working actuator.

13 Claims, 9 Drawing Sheets

TRAVELING HYDRAULIC WORKING MACHINE

TECHNICAL FIELD

The present invention relates to a traveling hydraulic working machine, such as a wheel loader or a telescopic handler, in which a transmission is driven by a prime mover (engine) to travel the machine and a hydraulic pump is also driven by the prime mover to operate a working actuator, thereby carrying out predetermined work.

BACKGROUND ART

In a known general traveling hydraulic working machine, a hydraulic pump is of the fixed displacement type, and the maximum absorption torque of the pump is also constant (fixed). Therefore, a proportion at which the engine output torque is distributed between respective operations of the hydraulic pump and travel (transmission) is constant and so is a maximum torque for the travel.

In connection with such a known general traveling hydraulic working machine, Japanese Patent No. 2968558 proposes an improved one employing a variable displacement hydraulic pump in such a manner that the maximum absorption torque of the hydraulic pump can be changed. According to this related art, the sum of respective loads of a travel driving device and a working actuator (i.e., the sum of the absorption torque of the hydraulic pump and the transmission torque (travel torque)) is detected. When the load sum is smaller than the output torque of an engine, the maximum absorption torque of the variable displacement hydraulic pump for the working actuator is maintained at a setting value, and when the load sum becomes larger than the engine output torque, e.g., when the machine is in a combined stall state, the maximum absorption torque of the variable displacement hydraulic pump is reduced, while the travel torque is increased to obtain a large tractive force. As a result, the engine output can be effectively utilized.

Patent Reference 1: Japanese Patent No. 2968558

DISCLOSURE OF THE INVENTION

One example of work carried out by a traveling hydraulic working machine, such as a wheel loader or a telescopic handler, is excavation of natural ground. In such excavation work, if a travel force can be increased when a bucket is pushed into earth and sand, the bucket can be more deeply pushed into the earth and sand, and the working efficiency can be improve correspondingly. In the known general traveling hydraulic working machine, because the maximum absorption torque of the hydraulic pump is constant (fixed), the travel force cannot be increased even in the above-mentioned type work.

According to the related art disclosed in Japanese Patent No. 2968558, when the bucket is pushed into earth and sand during the excavation of natural ground, the machine comes into an operating state in which the sum of the absorption torque of the hydraulic pump and the travel torque exceeds the engine output torque. Therefore, the maximum absorption torque of the hydraulic pump is reduced (hereinafter referred to as "maximum pump torque reducing control" for the sake of convenience), and the travel torque is increased correspondingly. As a result, the travel force can be increased and the working efficiency can be improved. However, the disclosed related art is designed just to detect the sum of respective loads of the travel driving device and the working actuator (i.e., the sum of the absorption torque of the hydraulic pump and the travel torque). Accordingly, a satisfactory result is obtained in limited types of work, whereas the workability deteriorates and the working efficiency decreases in some type of work.

In work of scooping earth and sand under traveling, for example, the earth and sand are scooped into the bucket by utilizing the travel force (tractive force) to push the bucket into the earth and sand while an upper front force is applied to the bucket so as to raise the bucket. During such scooping work, when the sum of he absorption torque of the hydraulic pump and the travel torque exceeds the engine output torque and the maximum pump torque reducing control is performed, the delivery rate of the hydraulic pump is reduced and the bucket raising speed is slowed down, thus leading to a reduction in the amount of work carried out.

Also, assuming the case that the front load is increased in a state where, for example, snow removing work is carried out at a constant speed while lowering a boom, if the maximum pump torque reducing control is performed, a larger travel force is produced and the snow removing work cannot be carried out at the constant speed.

It is an object of the present invention to provide a traveling hydraulic working machine, which can perform the maximum pump torque reducing control while accurately confirming a work situation during he combined operation of travel and a working actuator, and can maintain satisfactory combination in work and improve both the workability and the working efficiency.

(1) To achieve the above object, according to the present invention, in a traveling hydraulic working machine comprising at least one prime mover, a machine body mounting the prime mover thereon, traveling means provided in the machine body and including a torque converter coupled to the prime mover, a variable displacement hydraulic pump driven by the prime mover, at least one working actuator operated by a hydraulic fluid from the hydraulic pump, and an operating device for generating an operation signal to control the working actuator, the traveling hydraulic working machine further comprises first detecting means for detecting whether the sum of absorption torque of the hydraulic pump and travel torque of the traveling means exceeds output torque of the prime mover; second detecting means for detecting an operating situation of the traveling means; and pump torque modifying means for modifying maximum absorption torque of the hydraulic pump depending on the operating situation of the traveling means detected by the second detecting means when the first detecting means detects that the sum of the absorption torque of the hydraulic pump and the travel torque exceeds the output torque of the prime mover.

With those features, the first detecting means, the second detecting means and the pump torque modifying means are provided, and the maximum absorption torque of the hydraulic pump is modified depending on the operating situation of the traveling means detected by the second detecting means when the first detecting means detects that the sum of the absorption torque of the hydraulic pump and the travel torque exceeds the output torque of the prime mover. Therefore, the maximum pump torque reducing control can be performed while accurately confirming a work situation during the combined operation of travel and a working actuator. In addition, satisfactory combination in work can be maintained and an improvement of both the workability and the working efficiency can be realized.

(2) In above (1), preferably, the pump torque modifying means comprises first means for computing a modification torque when the first detecting means detects that the sum of the absorption torque of the hydraulic pump and the travel torque exceeds the output torque of the prime mover, second means for modifying the modification torque depending on the operating situation of the traveling means detected by the second detecting means, and third means for controlling the maximum absorption torque of the hydraulic pump to be reduced by an amount corresponding to the modification torque modified by the second means.

With those features, when it is detected that the sum of the absorption torque of the hydraulic pump and the travel torque exceeds the output torque of the prime mover, the maximum pump torque reducing control is performed depending on the operating situation of the traveling means. Therefore, the pump absorption torque can be reduced depending on the operating situation of the traveling means so that the travel torque can be increased.

(3) In above (2), preferably, the second detecting means is means for detecting, as the operating situation of the traveling means, an operating situation in which the traveling means requires what magnitude of travel torque, and the second means modifies the modification torque to be reduced or to become 0 when the second detecting means detects that the traveling means is in an operating situation not requiring a relatively large travel torque.

With those features, when the traveling means is in the operating situation not requiring a relatively large travel torque, the amount by which the maximum absorption torque of the hydraulic pump is reduced in the maximum pump torque reducing control can be suppressed so as to increase the amount of work carried out. When the traveling means is in an operating situation requiring a relatively large travel torque, the maximum absorption torque of the hydraulic pump is reduced in the maximum pump torque reducing control by an amount corresponding to the modification torque so that a larger travel torque can be obtained.

(4) Also in above (2), preferably, the second means modifies the modification torque to be variably reduced to 0 depending on the magnitude of travel torque required by the traveling means.

With this feature, since the amount by which the maximum absorption torque of the hydraulic pump is reduced is adjusted depending on the magnitude of travel torque required by the traveling means, the maximum pump torque reducing control can be performed in a finer manner.

(5) In above (1), preferably, the traveling hydraulic working machine further comprises third detecting means for detecting an operating situation of the working actuator, and the pump torque modifying means modifies the maximum absorption torque of the hydraulic pump depending on the operating situation of the traveling means detected by the second detecting means and the operating situation of the working actuator detected by the third detecting means when the first detecting means detects that the sum of the absorption torque of the hydraulic pump and the travel torque exceeds the output torque of the prime mover.

Thus, since the third detecting means is further provided and the pump torque modifying means modifies the maximum absorption torque of the hydraulic pump depending on the operating situation of the traveling means detected by the second detecting means and the operating situation of the working actuator detected by the third detecting means when the first detecting means detects that the sum of the absorption torque of the hydraulic pump and the travel torque exceeds the output torque of the prime mover, the maximum pump torque reducing control can be performed while accurately confirming a work situation during the combined operation of travel and a working actuator. In addition, satisfactory combination in work can be maintained and an improvement of both the workability and the working efficiency can be realized.

(6) In above (5), preferably, the pump torque modifying means comprises first means for computing a modification torque when the first detecting means detects that the sum of the absorption torque of the hydraulic pump and the travel torque exceeds the output torque of the prime mover, second means for modifying the modification torque depending on the operating situation of the traveling means detected by the second detecting means and the operating situation of the working actuator detected by the third detecting means, and third means for controlling the maximum absorption torque of the hydraulic pump to be reduced by an amount corresponding to the modification torque modified by the second means.

With those features, when it is detected that the sum of the absorption torque of the hydraulic pump and the travel torque exceeds the output torque of the prime mover, the maximum pump torque reducing control is performed depending on the operating situation of the traveling means and the operating situation of the working actuator. Therefore, the pump absorption torque can be reduced depending on the operating situation of the traveling means and the operating situation of the working actuator so that the travel torque can be increased.

(7) In above (6), preferably, the third detecting means is means for detecting, as the operating situation of the working actuator, an operating situation in which the working actuator requires what magnitude of pump delivery rate, and the second means modifies the modification torque to be reduced or to become 0 when the third detecting means detects that the working actuator is in an operating situation requiring a relatively large pump delivery rate.

With those features, when the working actuator is in the operating situation requiring a relatively large pump delivery rate, the amount by which the maximum absorption torque of the hydraulic pump is reduced in the maximum pump torque reducing control can be suppressed so as to increase the pump delivery rate, thereby increasing the amount of work carried out. When the working actuator is in an operating situation not requiring a relatively large pump delivery rate, the maximum absorption torque of the hydraulic pump is reduced in the maximum pump torque reducing control by an amount corresponding to the modification torque so that a larger travel torque can be obtained.

(8) In above (6), preferably, the second means modifies the modification torque to be variably reduced to 0 depending on the magnitude of pump absorption torque required by the working actuator.

With that feature, since the amount by which the maximum absorption torque of the hydraulic pump is reduced is adjusted depending on the magnitude of pump absorption torque required by the working actuator, the maximum pump torque reducing control can be performed in a finer manner.

(9) In above (1), preferably, the first detecting means is means for detecting whether a deviation between a target revolution speed and an actual revolution speed of the prime mover exceeds a preset value, and whether the sum of the absorption torque of the hydraulic pump and the travel torque of the traveling means exceeds the output torque of the prime mover is detected depending on whether the deviation between the target revolution speed and the actual revolution speed of the prime mover exceeds the preset value.

(10) In above (1), preferably, the second detecting means includes means for detecting input and output revolution speeds of the torque converter, and means for computing a torque converter speed ratio from the input and output revolution speeds of the torque converter, and the second detecting means detects the operating situation of the traveling means based on the torque converter speed ratio.

(11) In above (5), preferably, the third detecting means includes means for detecting one of a delivery pressure of the hydraulic pump and a driving pressure of the working actuator, and the third detecting means detects the operating situation of the working actuator based on the detected pressure.

(12) In above (5), preferably, the third detecting means includes means for detecting the operation signal generated by the operating device and detects the operating situation of the working actuator based on the detected operation signal.

ADVANTAGES OF THE INVENTION

According to the present invention, since the maximum absorption torque of the hydraulic pump can be modified while confirming a work situation on the whole during the combined operation of travel and a working actuator, it is possible to maintain satisfactory combination in work and improve both the workability and the working efficiency.

Figure 1:
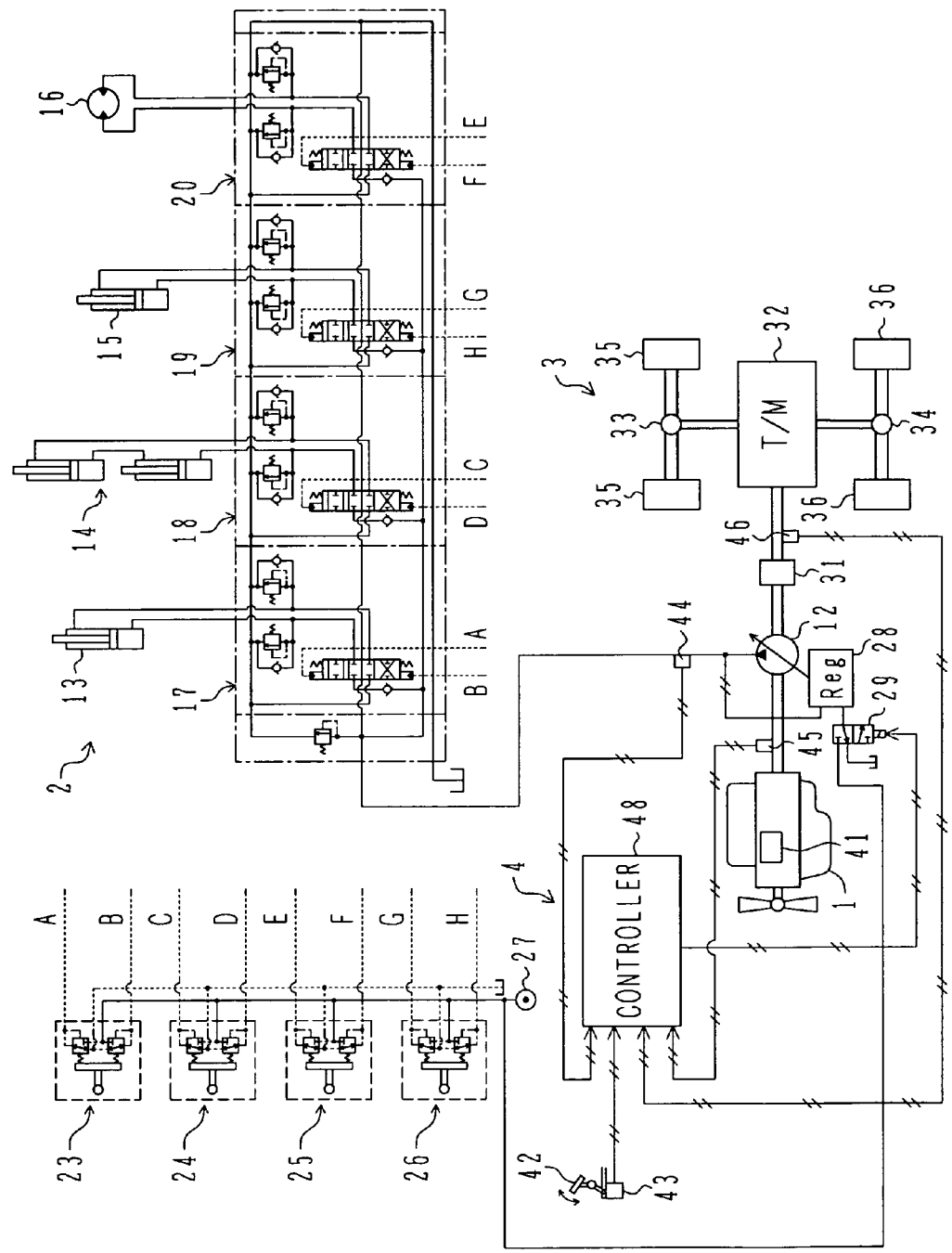
FIG. 1 is a diagram showing an overall system of a traveling hydraulic working machine according to a first embodiment of the present invention.

REFERENCE NUMERALS 1 prime mover (engine)
2 working system
3 traveling system
4, 4A control system
12 hydraulic pump
13, 14, 15, 16 hydraulic actuator
17, 18, 19, 20 direction control valve
23, 24, 25, 26 control lever unit
28 torque control regulator
29 torque control solenoid valve
31 torque converter
32 transmission
33, 34 differential gear
35 front wheel
36 rear wheel
42 accelerator pedal
43 position sensor
44 pressure sensor
45, 46 revolution sensor
48, 48A controller
61 pressure sensor
80 target revolution speed computing unit
81 base torque computing unit
82 revolution speed deviation computing unit
83 modification torque computing unit
84 speed ratio computing unit
85 traveling state determining unit
86 working state determining unit
87 selector
88 multiplier
89 adder
91 second working state determining unit
92 multiplier
101 machine body
102 cab
103 boom
104 fork (attachment)
105 bucket (attachment)
200 earth and sand
201 surface earth and sand

BEST MODE FOR CARRYING OUT THE INVENTION

Embodiments of the present invention will be described below with reference to the drawings.

FIG. 1 is a diagram showing an overall system of a traveling hydraulic working machine according to a first embodiment of the present invention.

In FIG. 1, the traveling hydraulic working machine according to this embodiment comprises a diesel engine (hereinafter referred to simply as an "engine") 1 serving as a prime mover, a working system 2 and a traveling system 3 both driven by the engine 1, and a control system 4.

The engine 1 includes an electronic governor 41, and the electronic governor 41 adjusts a fuel injection amount depending on a control input applied from an accelerator pedal 42 (i.e., an accelerator control input), to thereby regulate the revolution speed of the engine 1. In other words, the accelerator pedal 42 serves as a means operated by an operator and commanding an engine revolution speed as a target (hereinafter referred to simply as a "target revolution speed"). The target revolution speed is set depending on the amount by which the accelerator pedal is pressed down (i.e., an accelerator pressed-down amount).

The working system 2 comprises a hydraulic pump 12 driven by the engine 1, a plurality of hydraulic actuators (working actuators) 13, 14, 15 and 16 operated by a hydraulic fluid delivered from the hydraulic pump 12, directional control valves 17, 18, 19 and 20 disposed respectively between the hydraulic pump 12 and the plurality of hydraulic actuators 13, 14, 15 and 16 to control flows of the hydraulic fluid supplied to the corresponding actuators, a plurality of control lever units 23, 24, 25 and 26 for respectively shifting the directional control valves 17, 18, 19 and 20 and generating pilot pressures (operation signals) to control the hydraulic actuators 13, 14, 15 and 16, and a pilot hydraulic pump 27 for supplying a hydraulic fluid, which serves to provide an original pressure, to the control lever units 23, 24, 25 and 26.

The hydraulic pump 12 is of the variable displacement type and includes a torque control regulator 28. The torque control regulator 28 controls the tilting (displacement) of the hydraulic pump 12 such that, when the delivery pressure of the hydraulic pump 12 rises, the tilting (displacement) of the hydraulic pump 12 is reduced correspondingly to avoid the absorption torque of the hydraulic pump 12 from exceeding a setting value (maximum pump absorption torque). The setting value (maximum pump absorption torque) of the torque control regulator 28 is variable and controlled by a torque control solenoid valve 29. The torque control solenoid valve 29 is operated by an electric command signal and outputs a control pressure corresponding to the electric command signal with the delivery pressure of the pilot hydraulic pump 27 serving as a hydraulic pressure source.

The traveling system 3 comprises a torque converter 31 coupled to an output shaft of the engine 1 in series with respect to the hydraulic pump 12, a transmission (T/M) 32 coupled to an output shaft of the torque converter 31, and front wheels 35 and rear wheels 36 which are coupled to the transmission 32 respectively through differential gears 33, 34.

The control system 4 comprises a position sensor 43 for detecting the amount by which the accelerator pedal 42 is pressed down (i.e., the accelerator pressed-down amount), a pressure sensor 44 for detecting, as an operating situation of the hydraulic actuator, the delivery pressure of the hydraulic pump 12, a revolution sensor 45 for detecting an output revolution speed of the engine 1 (i.e., an input revolution speed of the torque converter 31), a revolution sensor 46 for detecting an output revolution speed of the torque converter 31, and a controller 48. The controller 48 has the engine control function of outputting, in accordance with a signal from the position sensor 43, a command signal to the electronic governor of the engine 1 so that the revolution speed corresponding to the accelerator pressed-down amount is obtained, and the pump control function of executing predetermined arithmetic and logical operations based on signals from the position sensor 43, the pressure sensor 44 and the revolution sensors 45, 46, and outputting a command signal to the torque control solenoid valve 29.

Figure 2:
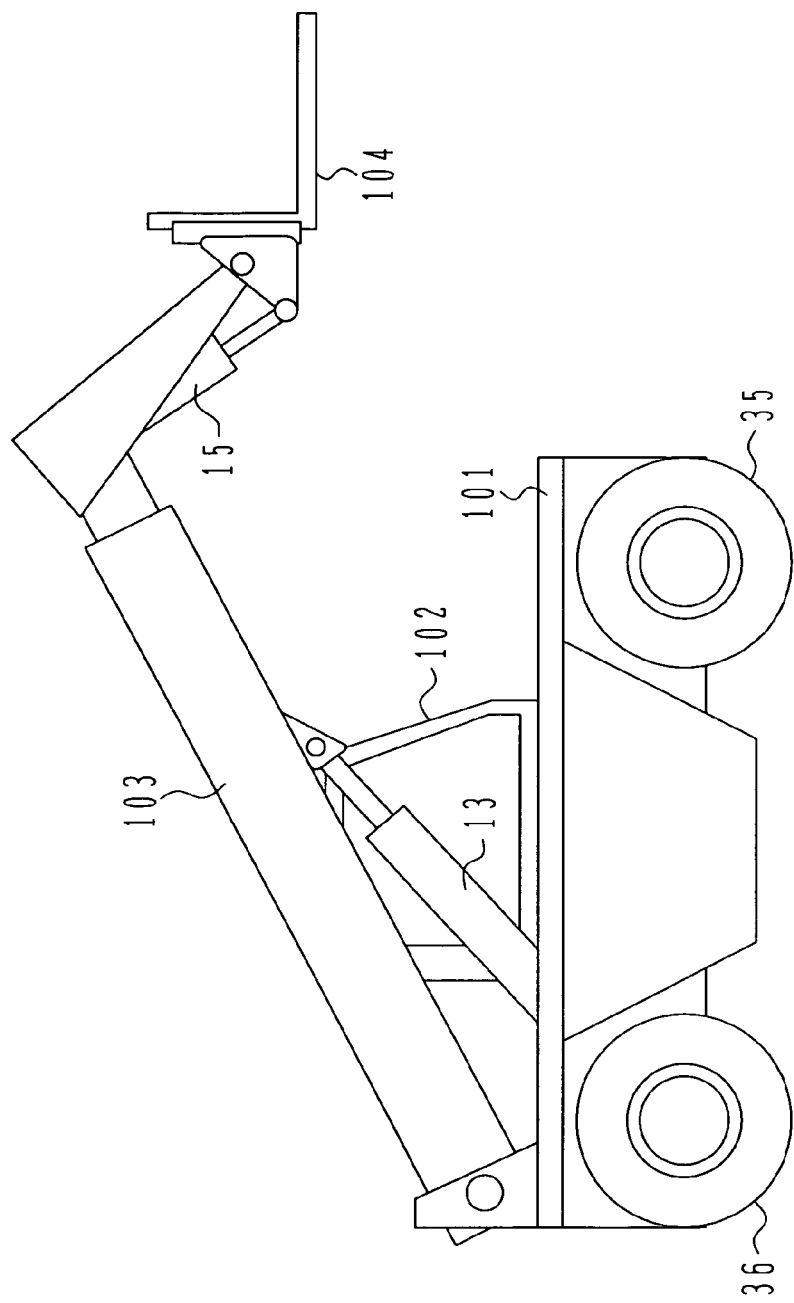
FIG. 2 is a side view showing an external appearance of a telescopic handler, the view showing the case where a fork for use in loading and unloading work is mounted as an attachment.
Figure 3:
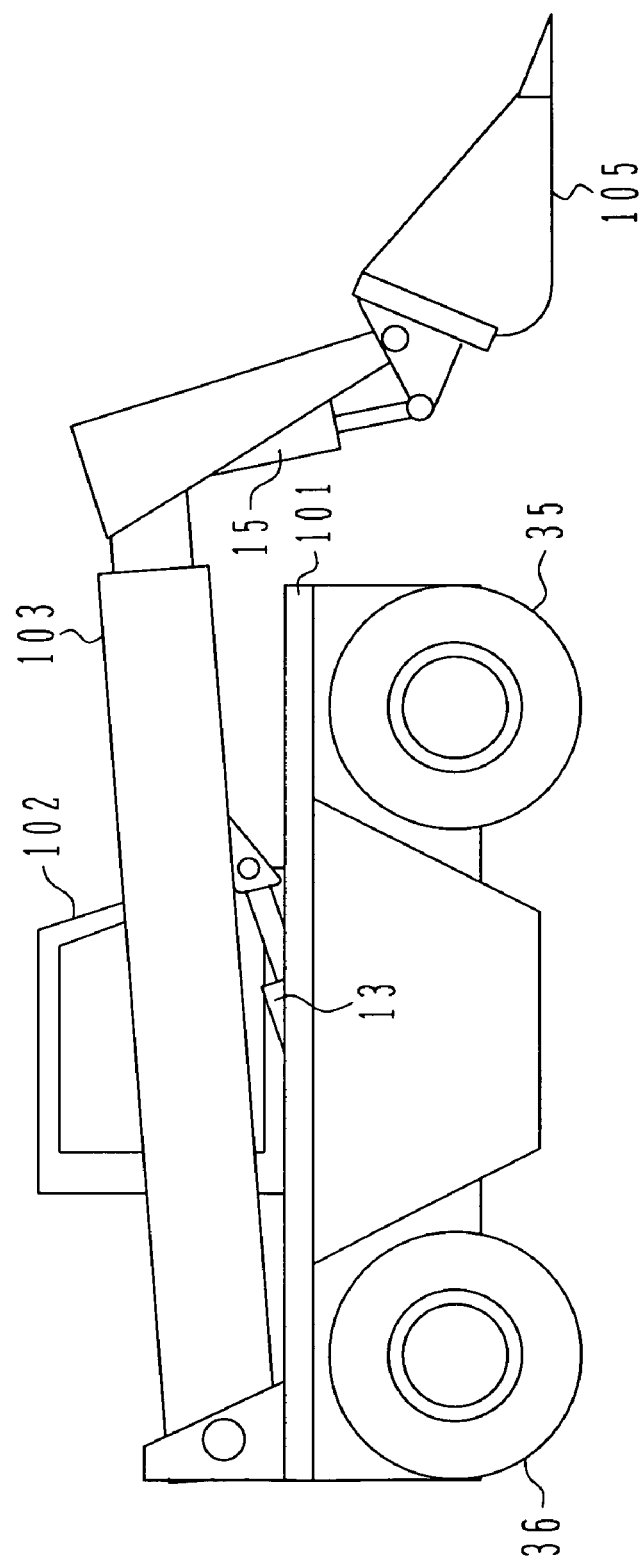
FIG. 3 is a side view showing an external appearance of a telescopic handler, the view showing the case where a bucket for use in excavation work and surface soil peeling-off work is mounted as an attachment.

FIGS. 2 and 3 each show an external appearance of a telescopic handler (also called a lift truck).

In this embodiment, the traveling hydraulic working machine is, by way of example, a telescopic handler. The telescopic handler comprises a machine body 101, a cab 102 located on the machine body 101, an extendable boom 103 mounted to the machine body 101 in a manner capable of pivotally rising and lowering laterally of the cab 102, and an attachment 104 or 105 rotatably mounted to a fore end of the boom 103. The front wheels 35 and the rear wheels 36 are mounted to the machine body 101, and the telescopic handler travels with the front wheels 35 and the rear wheels 36 driven by the motive power of the engine 1. The boom 103 and the attachment 104 or 105 constitute a working device. The attachment 104 shown in FIG. 2 is a fork for use in loading and unloading work, and the attachment 105 shown in FIG. 3 is a bucket for use in, e.g., excavation work and surface soil peeling-off work.

Returning to FIG. 1, the hydraulic actuators 13, 14 and 15 are, by way of example, a boom cylinder, a telescopic cylinder, and an attachment cylinder, respectively. The boom 103 is pivotally raised or lowered with extension or contraction of the boom cylinder 13, and is extended or contracted with extension or contraction of the telescopic cylinder 14. The attachment 104 or 105 is tilted with extension or contraction of the attachment cylinder 15. The hydraulic actuator 16 shown in FIG. 1 is a hydraulic motor for rotating a sweeper brush, for example, when a sweeper is used as the attachment. Those components, such as the engine 1, the hydraulic pump 12, the torque converter 31, and the transmission 32, are mounted to the machine body 101.

In the following description, the attachment 104 or 105 is referred to as the "front" for the sake of convenience, and a force applied from the hydraulic actuators 13, 14 and 15 to move the attachment 104 or 105 is referred to as a "front force" for the sake of convenience. Also, work carried out with the movement of the attachment 104 or 105 is referred to as "front work".

Figure 4:
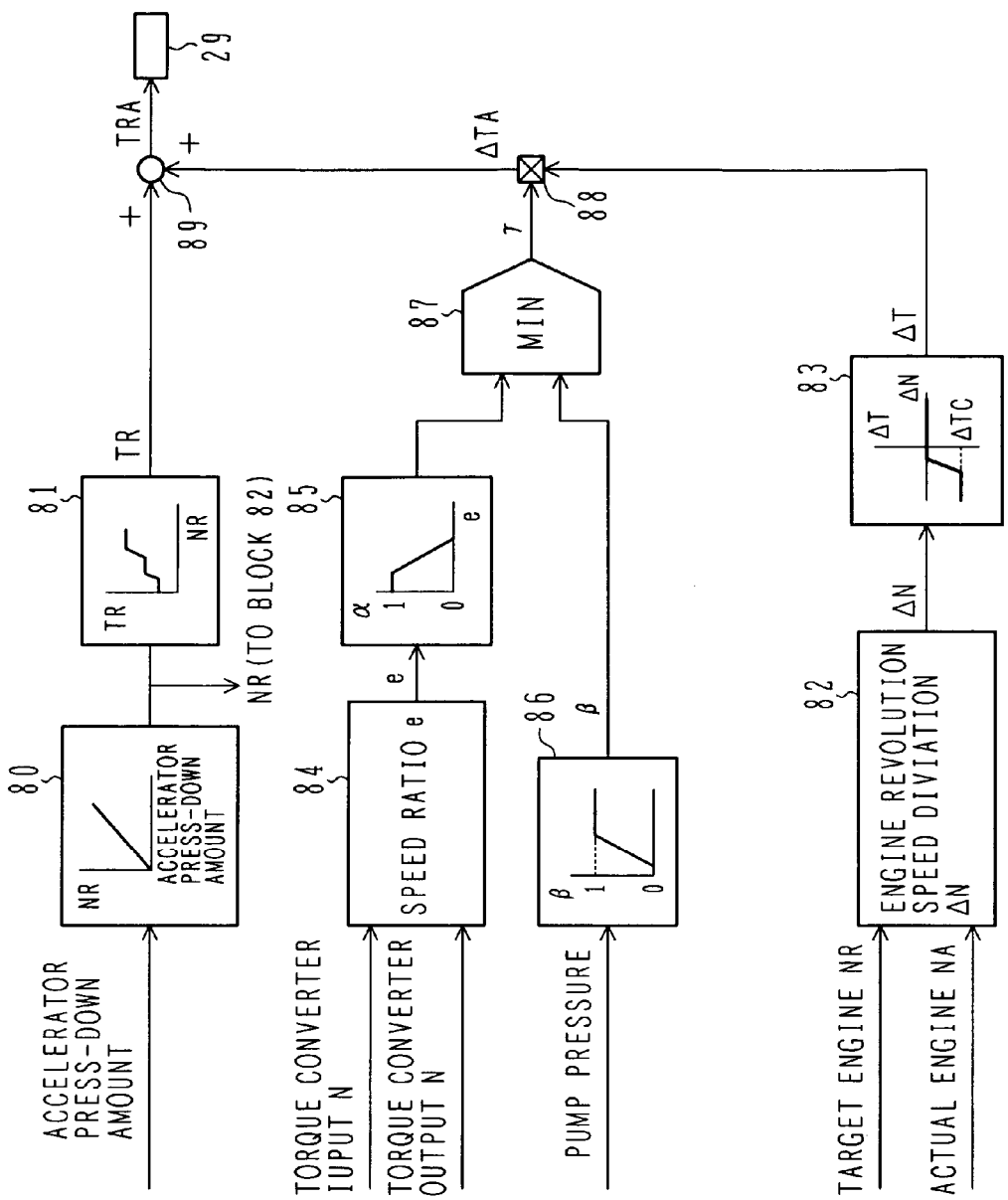
FIG. 4 is a functional block diagram showing the processing function of a controller in the first embodiment of the present invention.

FIG. 4 is a functional block diagram showing the processing function of the controller 48 related to pump control.

In FIG. 4, the controller 48 has various functions of a target revolution speed computing unit 80, a base torque computing unit 81, a revolution speed deviation computing unit 82, a modification torque computing unit 83, a speed ratio computing unit 84, a traveling state determining unit 85, a working state determining unit 86, a selector 87, a multiplier 88, and an adder 89.

The target revolution speed computing unit 80 receives a detected signal of the accelerator pressed-down amount from the position sensor 43 and refers to a table, which is stored in a memory, based on the received input, thereby computing a target engine revolution speed NR corresponding to the accelerator pressed-down amount at that time. The target revolution speed NR represents the engine revolution speed intended by the operator during work. In the table stored in the memory, the relationship between the target revolution speed NR and the accelerator pressed-down amount is set such that the target revolution speed NR is increased as the accelerator pressed-down amount increases.

The base torque computing unit 81 receives the target engine revolution speed NR and refers to a table, which is stored in a memory, based on the received input, thereby computing a pump base torque TR corresponding to the target revolution speed NR at that time. In the table stored in the memory, the relationship between NR and TR is set such that the pump base torque TR is increased as the target engine revolution speed NR rises.

The revolution speed deviation computing unit 82 subtracts the target engine revolution speed NR computed by the target revolution speed computing unit 80 from an actual engine revolution speed NA detected by the revolution sensor 45, thereby computing an engine revolution speed deviation $\Delta N$ (=NA−NR).

The modification torque computing unit 83 receives the revolution speed deviation $\Delta N$ computed by the revolution speed deviation computing unit 82, and refers to a table, which is stored in a memory, based on the received input, thereby computing a modification torque $\Delta T$ corresponding to the revolution speed deviation $\Delta N$ at that time. The modification torque $\Delta T$ is set with such an intention that, when the machine comes into a high-load operating state in which the hydraulic pump 12 consumes the maximum absorption torque and the sum of the pump absorption torque (i.e., the work load) and the input torque of the torque converter 31 (i.e., the travel torque) exceeds the engine output torque, the maximum absorption torque of the hydraulic pump 12 is reduced and the travel torque is increased so as to provide a larger tractive force correspondingly. In the table stored in the memory, the relationship between $\Delta N$ and $\Delta T$ is set as follows. When the actual engine revolution speed NA is matched with the target engine revolution speed NR and the revolution speed deviation $\Delta N$ is 0, $\Delta T=0$ is set. When the amount by which the actual engine revolution speed lowers is increased and the revolution speed deviation $\Delta N$ exceeds below a first setting value in a region where the revolution speed deviation $\Delta N$ has a negative value, the modification torque $\Delta T$ is gradually reduced from 0 in a region of negative value as the revolution speed deviation $\Delta N$ decreases. When the revolution speed deviation $\Delta N$ exceeds below a second setting value (<the first setting value), the modification torque $\Delta T$ is held at a constant value, i.e., $\Delta T=\Delta TC$.

The speed ratio computing unit 84 receives detected signals of the input and output revolution speeds of the torque converter 31 from the revolution speed sensors 45, 46, respectively, and computes e=output revolution speed/input revolution speed, thereby obtaining a torque converter speed ratio e.

The traveling state determining unit 85 receives the torque converter speed ratio e computed by the speed ratio computing unit 83, and refers to a table, which is stored in a memory, based on the received input, thereby computing a first determination coefficient $\alpha$ corresponding to the torque converter speed ratio e at that time. The first determination coefficient $\alpha$ is set with intent to limit the modification of the pump absorption torque (i.e., the reduction of the pump maximum absorption torque), which is made in accordance with the modification torque $\Delta T$ when the torque converter speed ration e is not small (when the torque converter 31 is not in a nearly stall state), i.e., in an operating situation where the travel system 3 does not require a large travel force (travel torque). In the table stored in the memory, the relationship between e and $\alpha$ is set as follows. When the torque converter speed ratio e is smaller than a first setting value, $\alpha=1$ is set. When the torque converter speed ratio e exceeds a second setting value (>the first setting value), $\alpha=0$ is set. When the torque converter speed ratio e is between the first setting value and the second setting value, $\alpha$ is reduced at a predetermined proportion (gain) as the torque converter speed ratio e increases.

The working state determining unit 86 receives a detected signal of the pump pressure from the pressure sensor 44, and refers to a table, which is stored in a memory, based on the received input, thereby computing a second determination coefficient $\beta$ corresponding to the pump pressure at that time. The second determination coefficient $\beta$ is set with intent to limit the modification of the pump absorption torque (i.e., the reduction of the pump maximum absorption torque), which is made in accordance with the modification torque $\Delta T$ when the delivery pressure of the hydraulic pump 12 is not so high (when the work load is not so large), i.e., in an operating situation where the working system 2 requires a relatively large pump delivery rate. In the table stored in the memory, the relationship between the pump pressure and $\beta$ is set as follows. When the pump pressure is lower than a first setting value, $\beta=0$ is set. When the pump pressure exceeds a second setting value (>the first setting value), $\beta=1$ is set. When the pump pressure is between the first setting value and the second setting value, $\beta$ is reduced at a predetermined proportion (gain) as the pump pressure lowers.

The selector 87 selects smaller one of the first determination coefficient $\alpha$ and the second determination coefficient $\beta$, and sets the selected one as a determination coefficient $\gamma$. Additionally, when the first determination coefficient $\alpha$ and the second determination coefficient $\beta$ are equal to each other, the selector 87 selects one of them, e.g., $\alpha$, in accordance with the preset logic.

The multiplier 88 multiplies the modification torque $\Delta T$ computed by the modification torque computing unit 83 by the determination coefficient $\gamma$ given as an output of the selector 87, thus providing a modification torque $\Delta TA$.

The adder 89 adds the modification torque $\Delta TA$ (negative value) to the pump base torque TR computed by the base torque computing unit 80, thus calculating a modified pump base torque TRA. The modified pump base torque TRA is converted to a command signal for the torque control solenoid valve 29 in accordance with a known method, and the command signal is outputted to the torque control solenoid valve 29. The torque control solenoid valve 29 outputs, to the torque control regulator 28, a control pressure corresponding to the command signal to make an adjustment such that the maximum pump absorption torque set in the torque control regulator 28 becomes TRA.

In the construction described above, the revolution speed sensor 45, the target revolution speed computing unit 80, the revolution speed deviation computing unit 82, and the modification torque computing unit 83 constitute first detecting means for detecting whether the sum of the absorption torque of the hydraulic pump 12 and the travel torque of the traveling system 3 (traveling means) exceeds the output torque of the engine (prime mover) 1. The revolution speed sensors 45, 46, the speed ratio computing unit 84, and the traveling state determining unit 85 constitute second detecting means for detecting the operating situation of the traveling system 3. The multiplier 88, and the adder 89 constitute pump torque modifying means for modifying the maximum absorption torque of the hydraulic pump 12 depending on the operating situation of the traveling system 3 detected by the second detecting means when the first detecting means detects that the sum of the absorption torque of the hydraulic pump 12 and the travel torque exceeds the output torque of the prime mover 1.

The modification torque computing unit 83 which constitutes part of said first detecting means produces a modification torque when the first detecting means detects that the sum of the absorption torque of the hydraulic pump 12 and the travel torque exceeds the output torque of the prime mover 1, the multiplier 88 constitutes first means for modifying the modification torque depending on the operating situation of the traveling means 3 detected by the second detecting means, and the adder 89 constitutes second means for controlling the maximum absorption torque of the hydraulic pump 12 to be reduced by an amount corresponding to the modification torque modified by the second means (88).

The pressure sensor 44 and the working state determining unit 86 constitute third detecting means for detecting operating situations of the working actuators 13 to 16. The pump torque modifying means (i.e., the multiplier 88, and the adder 89) modifies the maximum absorption torque of the hydraulic pump 12 depending on the operating situation of the traveling system 3 detected by the second detecting means and the operating situations of the working actuators 13 to 16 detected by the third detecting means when the first detecting means detects that the sum of the absorption torque of the hydraulic pump 12 and the travel torque exceeds the output torque of the prime mover 1. In that case, the selector 87 and the multiplier 88 constitute first means for modifying the modification torque depending on the operating situation of the traveling means detected by the second detecting means and the operating situations of the working actuators 13 to 16 detected by the third detecting means.

Figure 5:
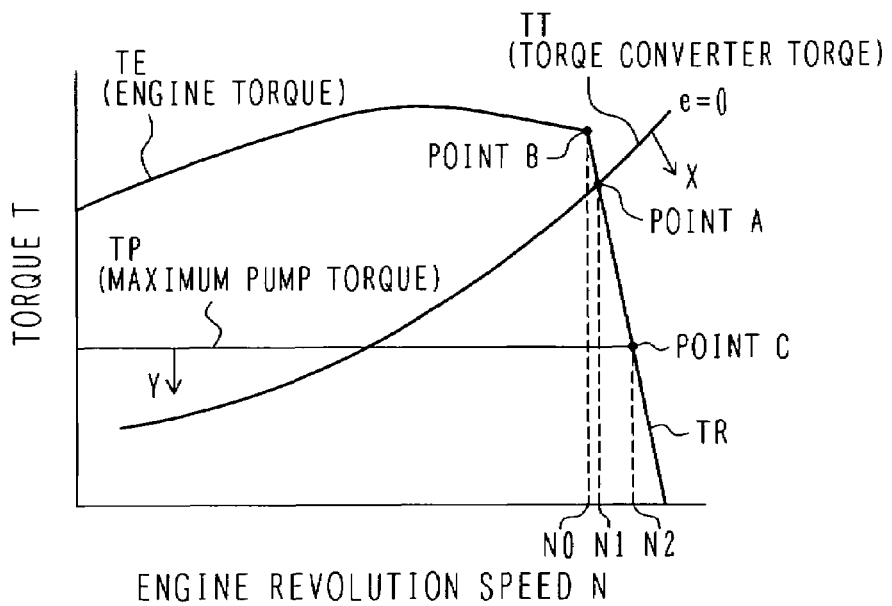
FIG. 5 is a graph showing the setting relationship of the output torque of a torque converter and the absorption torque of a hydraulic pump 12 with respect to an engine output in the traveling hydraulic working machine according to the first embodiment.

With reference to FIG. 5, a description is made of the setting relationship between the output torque of the torque converter 31 (hereinafter referred to as the "torque converter torque" for the sake of convenience) and the absorption torque of the hydraulic pump 12 (hereinafter referred to as the "torque converter torque" for the sake of convenience) in the traveling hydraulic working machine according to this embodiment. In FIG. 5, the horizontal axis represents the revolution speed of the engine 1, and the vertical axis represents the torque. Also, TE represents the output torque of the engine 1 (hereinafter referred to as the "engine torque" for the sake of convenience) in a full load region where the fuel injection amount of the electronic governor 41 is maximized, and TR represents the output torque of the engine 1 (hereinafter referred to as the "engine torque" for the sake of convenience) in a regulation region corresponding to a stage before the fuel injection amount of the electronic governor 41 is maximized. Further, TT represents the output torque of the torque converter 31 (i.e., the torque converter torque), and TP represents the maximum absorption torque of the hydraulic pump 12 (hereinafter referred to as the "maximum pump torque" for the sake of convenience).

The torque converter torque TT shown in FIG. 5 represents one resulting when the torque converter 31 is in a stall state (where the output revolution speed is 0 and the speed ratio e=0 holds). As the hydraulic working machine starts traveling and the speed ratio increases from 0, the characteristic curve is shifted in the direction of and arrow X, shown in FIG. 5, such that the torque converter torque TT is reduced. The maximum pump torque TP shown in FIG. 5 represents torque (TPmax) resulting when the accelerator pedal 42 is pressed down in a maximum stroke to set the target revolution speed of the engine 1 to a maximum rated revolution speed N0 and the modification torque ΔTA computed by the multiplier 88 is 0. As the amount by which the accelerator pedal 42 is pressed down is lessened to reduce the engine revolution speed, the target revolution speed NR computed by the target revolution speed computing unit 80 is also reduced and so is the base torque TR computed by the base torque computing unit 81. Accordingly, the maximum pump torque PT decreases as indicated by an arrow Y in FIG. 5. Further, as the modification torque ΔT decreases from 0 (namely, as an absolute value of ΔTA increases), the modified pump base torque TRA is reduced, and therefore the maximum pump torque TP decreases likewise as indicated by the arrow Y in FIG. 5.

In the case of the traveling hydraulic working machine equipped with the torque converter as in this embodiment, the travel force (tractive force) is very important. Hence, the engine 1 is selected to be of the type that the output torque (point B) at the maximum rated revolution speed N0 is larger than a maximum value (point A) of the torque converter torque with a large allowance. On the other hand, the maximum pump torque is decided depending on excavation balance (i.e., balance between the travel/tractive force and the front force) during work using the bucket, and it is basically provided as a value (point C) smaller than the torque converter torque. The engine revolution speed at the point A is N1 (>N0), and the engine revolution speed at the point C is N2 (>N0). In the traveling hydraulic working machine equipped with the torque converter, therefore, the revolution speed of the engine 1 is kept from becoming below the target rated revolution speed N0 not only in the front sole operation, but also in the travel sole operation.

The operation of this embodiment will be described below.

Figure 6:
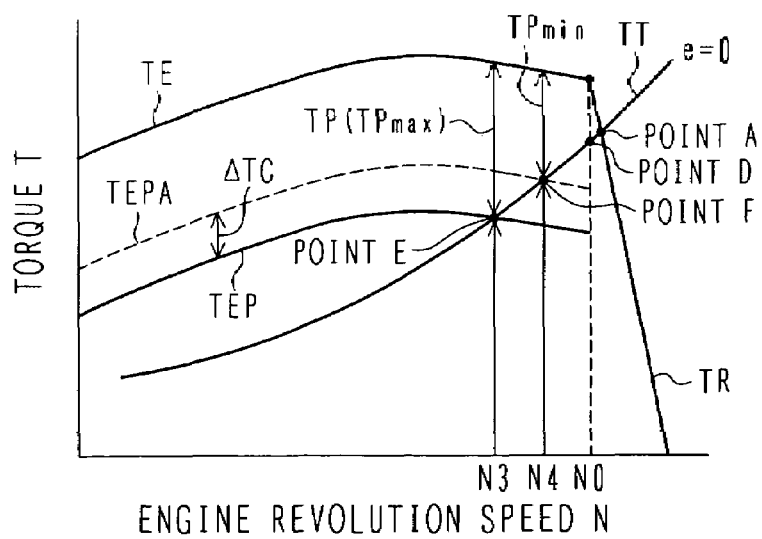
FIG. 6 is a graph showing an operating state of the traveling hydraulic working machine according to the first embodiment.
Figure 7:
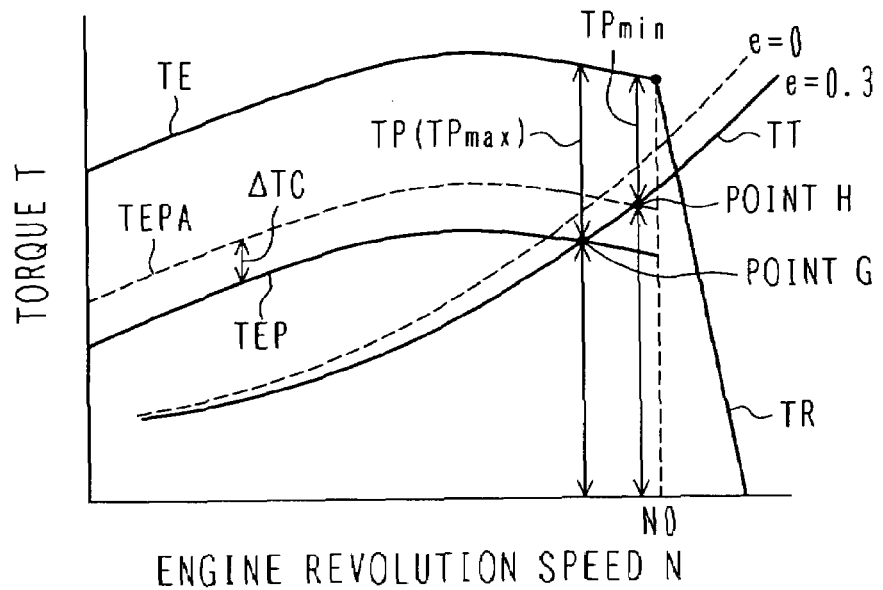
FIG. 7 is a graph showing an operating state of the traveling hydraulic working machine according to the first embodiment.
Figure 8:
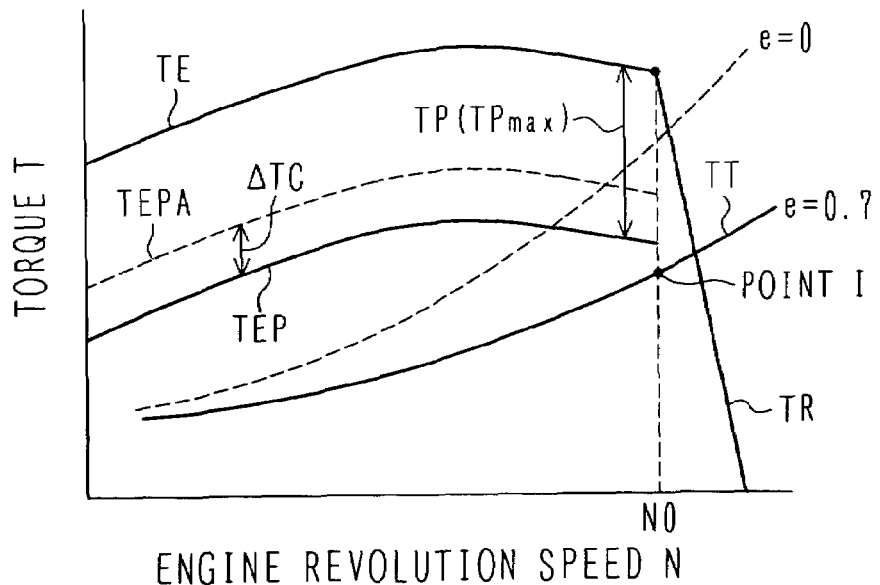
FIG. 8 is a graph showing an operating state of the traveling hydraulic working machine according to the first embodiment.
Figure 9:
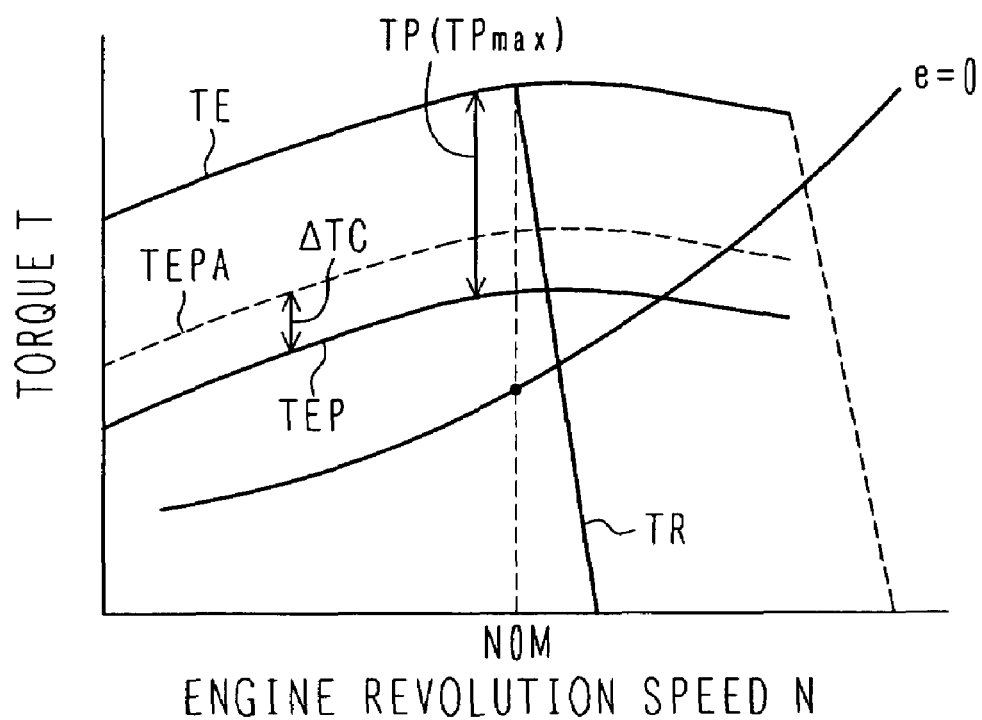
FIG. 9 is a graph showing an operating state of the traveling hydraulic working machine according to the first embodiment.

FIGS. 6 to 9 show the operating state of the traveling hydraulic working machine according to this embodiment. FIGS. 6 to 8 each represent the case where the accelerator pedal 42 is pressed down substantially in a maximum stroke to set the target engine revolution speed NR to the rated revolution speed N0, while FIG. 9 represents the case where the accelerator pedal 42 is pressed down substantially half to set an intermediate target revolution speed NM. Also, FIGS. 6 and 9 each represent the case where the torque converter 31 is in the stall state and the speed ratio e is given as e=0, while FIGS. 7 and 8 each represent the case where the torque converter 31 has a certain output revolution speed and the speed ratio e is given as e=about 0.3 and e=about 0.7, respectively.

In FIGS. 6 to 9, TEP represents the remainder obtained by subtracting TPmax from TE, i.e., the engine torque that is available by the torque converter 31 (on the travel side) when the hydraulic pump 12 consumes the maximum absorption torque TP. TPmin represents the maximum pump torque resulting when the maximum pump torque TP is reduced by an amount corresponding to the modification torque ΔTC, and TEPA represents the remainder obtained by subtracting TPmin from TE, i.e., the engine torque that is available by the torque converter 31 when the maximum pump torque TP is reduced by an amount corresponding to the modification torque ΔTC. When the modification torque ΔTA varies between 0 and ΔTC, the maximum absorption torque TP of the hydraulic pump 12 is changed between TPmax and TPmin, and the engine torque available by the torque converter 31 is changed between TEP and TEPA.

<Operating State 1: Point A or Point D in FIG. 6>

When the front work is not performed even with the torque converter 31 being in the stall state (e=0), or when the pump delivery pressure is low and the pump torque consumed by the hydraulic pump 12 is small even during the front work, the relationship of (engine torque≧torque converter torque+pump torque) holds. In this case, the engine revolution speed is not reduced, and the matching point between the travel load and the pump load (actuator load) is positioned near a point A or a point D in FIG. 6, i.e., near an intersection between the curve representing TT and a straight line extended upward from the rated revolution speed N0. On that occasion, the revolution speed deviation computed by the revolution speed deviation computing unit 82 in FIG. 4 is provided as ΔN≈0, and the modification torque computed by the modification torque computing unit 83 is provided as ΔT=0. Accordingly, the maximum pump torque TP is not reduced.

<Operating State 2: Point F in FIG. 6>

When the torque converter 31 is in the stall state (e=0) and the torque consumed by the hydraulic pump 12 is increased to such an extent that the relationship of (engine torque<torque converter torque+pump torque) holds, the engine 1 comes into an overload state and the actual engine revolution speed NA is slowed down. Therefore, the revolution speed deviation computing unit 82 in FIG. 4 computes the revolution speed deviation ΔN<0, and the modification torque computing unit 83 computes the modification torque ΔT>0, e.g., ΔT=ΔTC. Also, because the speed ratio e=0 is held and the pump pressure during the front work is high, the traveling state determining unit 85 computes the first determination coefficient α=1, the working state determining unit 86 computes the second determination coefficient β=1, and the selector 87 selects the determination coefficient γ=1. As a result, the multiplier 88 computes the modification torque ΔTA=ΔT, e.g., ΔTA=ΔTC. Responsively, the maximum pump torque TP is reduced by an amount corresponding to ΔTC and becomes TPmin. This increases, to TEPA, the engine torque that is available by the torque converter 31 when the hydraulic pump 12 consumes the maximum pump torque TP. In this case, therefore, the matching point between the travel load and the pump load is positioned at a point F, i.e., an intersection between the curve representing TT (e=0) and a curve representing TEPA, and the engine revolution speed is reduced from the rated revolution speed N0 to N4.

Looking at the known general traveling hydraulic working machine employing the fixed displacement hydraulic pump, in the same operating state as that described above, the maximum pump torque TP is not changed and the engine torque available by the torque converter 31 remains at TEP. Therefore, the matching point between the travel load and the pump load is positioned at a point E, i.e., an intersection between the curve representing TT (e=0) and a curve representing TEP, and the engine revolution speed is reduced to N3 (<N4).

When the torque converter 31 is in the stall state where e=0 holds, work requiring the travel/tractive force (i.e., the pushing force), such as excavation of natural ground, is carried out in many cases. In the known general traveling hydraulic working machine, the maximum pump torque TP is not changed and the engine torque available by the torque converter 31 remains at TEP. Therefore, the travel/tractive force (i.e., the pushing force) cannot be increased. In contrast, according to this embodiment, since the travel force (tractive force) is increased from TEP to TEPA, a larger tractive force can be ensured in the operating state requiring the tractive force, such as occurred in excavation of natural ground, and the engine output can be effectively utilized.

<Operating State 3: Point G in FIG. 7>

Also, in the case where the speed ratio of the torque converter 31 is e=about 0.3 and the relationship of (engine torque<torque converter torque+pump torque) holds, the engine 1 comes into an overload state and the actual engine revolution speed NA is slowed down. Therefore, the revolution speed deviation computing unit 82 in FIG. 4 computes the revolution speed deviation ΔN<0, and the modification torque computing unit 83 computes the modification torque ΔT>0, e.g., ΔT=ΔTC. On the other hand, assuming here that the traveling state determining unit 85 has the second setting value<0.3, the traveling state determining unit 85 computes the first determination coefficient α=0, and the selector 87 selects the determination coefficient γ=0. As a result, the multiplier 88 computes the modification torque ΔTA=0. Responsively, the maximum pump torque TP is not reduced and remains at TPmax. This keeps, at TEP, the engine torque that is available by the torque converter 31 when the hydraulic pump 12 consumes the maximum absorption torque TP. In this case, therefore, the matching point between the travel load and the pump load is positioned at a point G, i.e., an intersection between a curve representing TT (e=0.3) and a curve representing TEP in FIG. 7.

Looking at the related art disclosed in Japanese Patent No. 2968558, in the same operating state as that described above, because the actual traveling state is not taken into consideration, the maximum absorption torque TP is reduced and the engine torque available by the torque converter 31 is increased to TEPA, similarly to the case of Operating State 2, as soon as the relationship of (engine torque<torque converter torque+pump torque) holds. Therefore, the matching point between the travel load and the pump load is positioned at a point H, i.e., an intersection between the curve representing TT (e=0.3) and a curve representing TEPA.

When the machine is in the traveling state of e=about 0.3, it is advantageous in many cases that the engine torque is supplied to the hydraulic pump at a larger proportion for the purpose of increasing the amount of work carried out. With the related art disclosed in Japanese Patent No. 2968558, even in such a case, the maximum pump torque TP is reduced and the engine torque available by the torque converter 31 is increased to TEPA, thus resulting in a reduction in the amount of work carried out on the pump side. In contrast, according to this embodiment, the maximum pump torque TP is not reduced and the hydraulic pump 12 can increase the pump torque up to the maximum TP. It is hence possible to ensure a large front force and to increase the amount of work carried out.

<Operating State 4: Point I in FIG. 8>

Even in the case of the accelerator pedal 42 being pressed down in a maximum stroke to set the rated revolution speed N0 such that the maximum torque converter torque can be produced, in the traveling state of e=about 0.7, the relationship of (engine torque>torque converter torque+pump torque) is held and the engine revolution speed is not reduced. Therefore, the matching point between the travel load and the pump load is positioned at a point I, i.e., an intersection between a curve representing TT (e=0.7) and a straight line extended upward from the rated revolution speed N0 in FIG. 8. In such an operating state, there is an allowance in the engine torque even when the hydraulic pump 12 consumes the maximum pump torque TP. It is hence not required to reduce the maximum pump torque TP.

With this embodiment, in the case described above, the revolution speed deviation computed by the revolution speed deviation computing unit 82 is provided as ΔN≈0, and therefore the modification torque computed by the modification torque computing unit 83 is provided as ΔT=0 similarly to the case of Operating State 1. Accordingly, the maximum pump torque TP is not reduced.

<Operating State 5: Point J in FIG. 9>

When the accelerator pedal 42 is pressed down substantially half to set the intermediate target revolution speed NM, the output torque is provided as a value proportional to the revolutions based on characteristics of the torque converter 31 even with the torque converter 31 being in the stall state and the speed ratio e being given as e=0. Therefore, the torque converter torque capable of being developed is reduced and the relationship of (engine torque>torque converter torque+pump torque) is held. As a result, the engine revolution speed is not reduced and the matching point between the travel load and the pump load is positioned at a point J, i.e., an intersection between the curve representing TT (e=0) and a straight line extended upward from a target engine revolution speed N0M in FIG. 9. Also in this case, there is an allowance in the engine torque even when the hydraulic pump 12 consumes the maximum pump torque TP. It is hence not required to reduce the maximum pump torque TP.

In such an operating state, depending on conditions, the traveling state determining unit 85 computes the first determination coefficient α=1, the working state determining unit 86 computes the second determination coefficient β=1, and the selector 87 selects the determination coefficient γ=1. With this embodiment, on that occasion, the revolution speed deviation computed by the revolution speed deviation computing unit 82 is provided as $\Delta N \approx 0$, and therefore the modification torque computed by the modification torque computing unit 83 is provided as $\Delta T = 0$. Accordingly, the modification torque $\Delta TA$ computed by the multiplier 88 is 0 and the maximum pump torque TP is not reduced. Thus, since the hydraulic pump 12 can increase the pump torque up to the maximum TPmax, it is possible to ensure a large front force and to increase the amount of work carried out.

Practical work examples according to this embodiment will be described below.

<Work Example 1>

One example of work carried out with the bucket 105 (see FIG. 3) mounted as the front attachment is excavation of natural ground. In the excavation work, the bucket 105 serving as the front attachment is pushed into earth and sand (excavation target) by the travel force (tractive force) while the accelerator pedal 42 is operated to control the engine revolution speed, and an upward front force is then applied to the bucket 105, causing the bucket to gradually run off upward, whereby the earth and sand is excavated. During a bucket pushing operation in the excavation work, the torque converter 31 comes into a combined stall state and the relationship of (engine torque<torque converter torque+pump torque) holds. The term "combined stall state" means a state where the torque converter 31 is in the stall state (e=0) and the hydraulic pump 12 is in a relief state in which the delivery pressure of the hydraulic pump 12 rises up to the setting pressure of a main relief valve (not shown).

In the known general traveling hydraulic working machine, the maximum absorption torque of the hydraulic pump is constant (fixed). In the combined stall state, therefore, the matching point is positioned at the point E in FIG. 6 and the engine revolution speed is given as N3. Then, the output torque of the engine 1 is employed by the hydraulic pump 12 with priority.

According to this embodiment, when the torque converter 31 comes into the combined stall state during the bucket pushing operation in the excavation work, the engine revolution speed is reduced and the modification torque computing unit 83 computes the modification torque $\Delta T = \Delta TC$. Also, at this time, because of being in the combined stall state, the speed ratio computing unit 84 computes $e \approx 0$ as the speed ratio e, the traveling state determining unit 85 computes α=1 as the first determination coefficient α. Further, because of the hydraulic pump 12 being in the relief state, the working state determining unit 86 computes β=1 as the second determination coefficient β, and the selector 87 outputs γ=1 as the determination coefficient γ. Therefore, the multiplier 88 computes the modification torque $\Delta TA = \Delta T$, and the adder 89 computes, as the modified base torque TRA, an added value of the base torque TR computed by the base torque computing unit 81 and the modification torque $\Delta TA$ (=$\Delta TC$) (i.e., a value obtained by subtracting an absolute value of $\Delta TA$ from TR). In other words, the modified base torque TRA is reduced by an amount corresponding to the modification torque $\Delta TC$. As a result, the maximum pump torque TP is reduced to TPmin and the engine torque TEP available for the travel is increased to TEPA indicated by a broken line from a solid line shown in FIG. 6, whereby the matching point is positioned at the point F in FIG. 6. Thus, the torque converter torque is increased to increase the tractive force, and the engine output can be effectively utilized.

Further, in an operation of raising the bucket after the bucket pushing operation, the delivery pressure of the hydraulic pump 12 lowers. On this occasion, because of the working state determining unit 86 setting therein the relationship between the pump pressure and the determination coefficient β such that β is reduced at a predetermined gain as the pump pressure lowers, when the delivery pressure of the hydraulic pump 2 becomes lower than the second setting value set in the working state determining unit 86, a value of 0<β<1 depending on the pump pressure is computed as the determination coefficient β. In this case, therefore, the relationship of α>β is held, whereby the selector 87 selects the determination coefficient β and outputs γ=β as the determination coefficient γ. Responsively, the multiplier 88 computes the modification torque $\Delta TC$ (negative value) as a value increased depending on β (i.e., $\Delta TC$ having a decreased absolute value), and the maximum pump torque TP is increased from TPmin. As a result, in comparison with the case of β=1, the delivery rate of the hydraulic pump 12 is increased to raise the bucket speed, thus leading to the increased amount of work carried out. Although the travel force is reduced in this case, such a reduction of the travel force is of no problem because the machine is now in the operation of raising the bucket after the bucket pushing operation. Stated another way, since the amount by which the maximum pump torque TP is reduced is adjusted depending on a magnitude of the pump delivery rate demanded by the working system 2, it is possible to perform the maximum pump torque reducing control in a finer manner and to further improve the workability. In addition, the pump delivery rate or the travel torque can be prevented from changing abruptly.

<Work Example 2>

Another example of work carried out using the bucket 105 is work of scooping earth and sand while traveling. In the scooping work, the bucket 105 is pushed into earth and sand (excavation target) by the travel force (tractive force) while the accelerator pedal 42 is operated to control the engine revolution speed, and at the same time an upward front force is applied to the bucket 105 so as to raise it, whereby the earth and sand is scooped into the bucket. In such work of scooping earth and sand while traveling, the machine is in the traveling state where the speed ratio of the torque converter 31 is, e.g., about 0.3. However, because the bucket is pushed into the earth and sand at the same time, the torque converter torque is required to be a relatively large torque. Further, because the bucket 105 is raised upward while being pushed into the earth and sand, the delivery pressure of the hydraulic pump 12 (i.e., the work load) rises up to nearly the relief pressure. This holds the relationship of (engine torque<torque converter torque+pump torque).

In the related art disclosed in Japanese Patent No. 2968558, when the relationship of (engine torque<torque converter torque+pump torque) is held, this state is detected depending on a reduction of the engine revolution speed. Responsively, the maximum pump torque TP is immediately reduced to TPmin and the engine torque available by the torque converter 31 is increased to TEPA. Therefore, the pump torque is reduced and the matching point is positioned at the point H in FIG. 7, whereby the delivery rate of the hydraulic pump 12 is reduced. This results in the problem that the bucket raising speed is slowed down and the amount of work carried out is reduced.

According to this embodiment, in the work scooping earth and sand while traveling, even when the engine revolution speed is reduced upon the relationship of (engine torque<torque converter torque+pump torque) being held and the modification torque computing unit 83 computes the modification torque $\Delta T=\Delta TC$, the speed ratio computed by the speed ratio computing unit 84 is given as e=about 0.3 and the speed ratio e is larger than (>) the second setting value of the traveling state determining unit 85. Therefore, the traveling state determining unit 85 computes $\alpha=0$ as the first determination coefficient $\alpha$, and the selector 87 outputs $\gamma=0$ as the determination coefficient $\gamma$. The multiplier 88 hence computes the modification torque $\Delta TA=0$. Responsively, the maximum pump torque TP is not reduced and remains at TPmax, and the matching point is positioned at the point G in FIG. 7. As a result, the delivery rate of the hydraulic pump 12 is not reduced, and the bucket speed can be raised to increase the amount of work carried out.

Further, when the bucket strikes against hard earth and sand during travel, the traveling speed is slowed down and the torque converter speed ratio e becomes e=about 0.2 in some cases. On that occasion, because of the traveling state determining unit 85 setting therein the relationship between e and $\alpha$ such that $\alpha$ is reduced at a predetermined gain as the torque converter speed ratio e increases, a value of $0<\alpha<1$ depending on the speed ratio e is computed as the determination coefficient $\alpha$. In this case, therefore, since the relationship of $\beta>\alpha$ is held, the selector 87 selects the determination coefficient $\alpha$ and outputs $\gamma=\alpha$ as the determination coefficient $\gamma$. Responsively, the multiplier 88 computes the modification torque $\Delta TC$ (negative value) as a value increased depending on $\alpha$ (i.e., $\Delta TC$ having a decreased absolute value). Thus, the maximum pump torque TP is reduced from TPmax and the engine torque TEP available for travel is given as a value between the solid line and the broken line in FIG. 6. As a result, in comparison with the case of the maximum pump torque TP being at TPmax, the travel force is increased and the workability is improved. Stated another way, since the amount by which the maximum pump torque TP is reduced is adjusted depending on a magnitude of the travel torque (speed ratio e) demanded by the traveling system 3, it is possible to perform the maximum pump torque reducing control in a finer manner and to further improve the workability. In addition, the travel torque or the pump delivery rate can be prevented from changing abruptly.

With this embodiment described above, the maximum pump torque reducing control can be performed while accurately confirming a work situation during the combined operation of the travel and the working actuator. Hence, satisfactory combination in work can be maintained and an improvement of both the workability and the working efficiency can be realized.

A second embodiment of the present invention will be described with reference to FIGS. 10 and 11. Note that, in FIGS. 10 and 11, components identical to those in FIGS. 1 and 4 are denoted by the same symbols.

Figure 10:
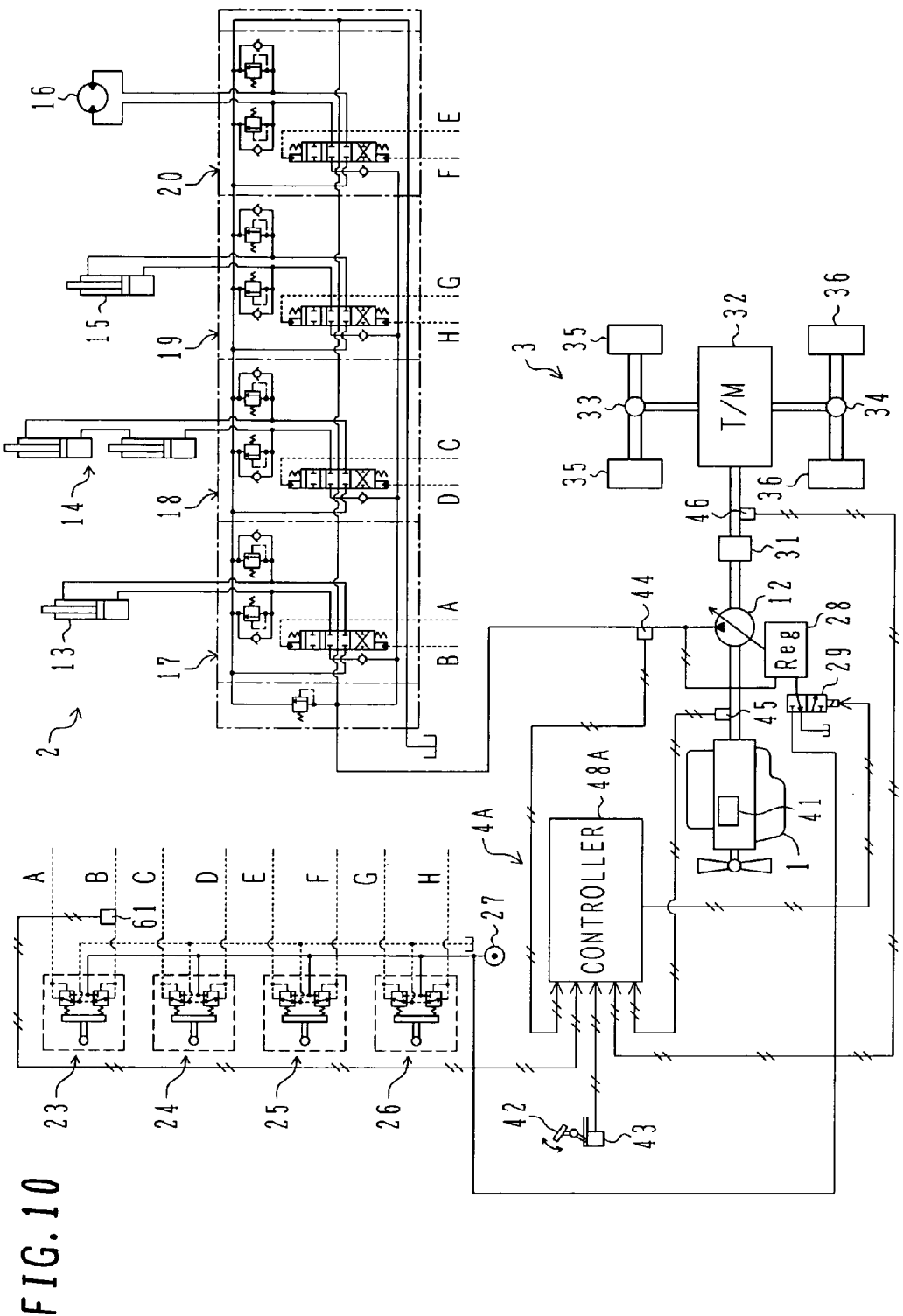
FIG. 10 is a diagram showing an overall system of a traveling hydraulic working machine according to a second embodiment of the present invention.

In FIG. 10, a traveling hydraulic working machine according to this embodiment comprises an engine 1, a working system 2, a traveling system 3, and a control system 4A. The working system 2 and the traveling system 3 have the same constructions as those in the first embodiment shown in FIG. 1.

The control system 4A includes, in addition to the components in the first embodiment shown in FIG. 1, a pressure sensor 61 for detecting, as the operating situation of the working system 2, the pilot pressure in the direction in which the hydraulic actuator 13 is contracted (i.e., the boom-lowering pilot pressure) from among the pilot pressures outputted from the control lever units 23. A controller 48A executes predetermined arithmetic and logical operations based on signals from the position sensor 43, the pressure sensor 44, the revolution sensors 45, 46 and the pressure sensor 61, and then outputs a command signal to the torque control solenoid valve 29.

Figure 11:
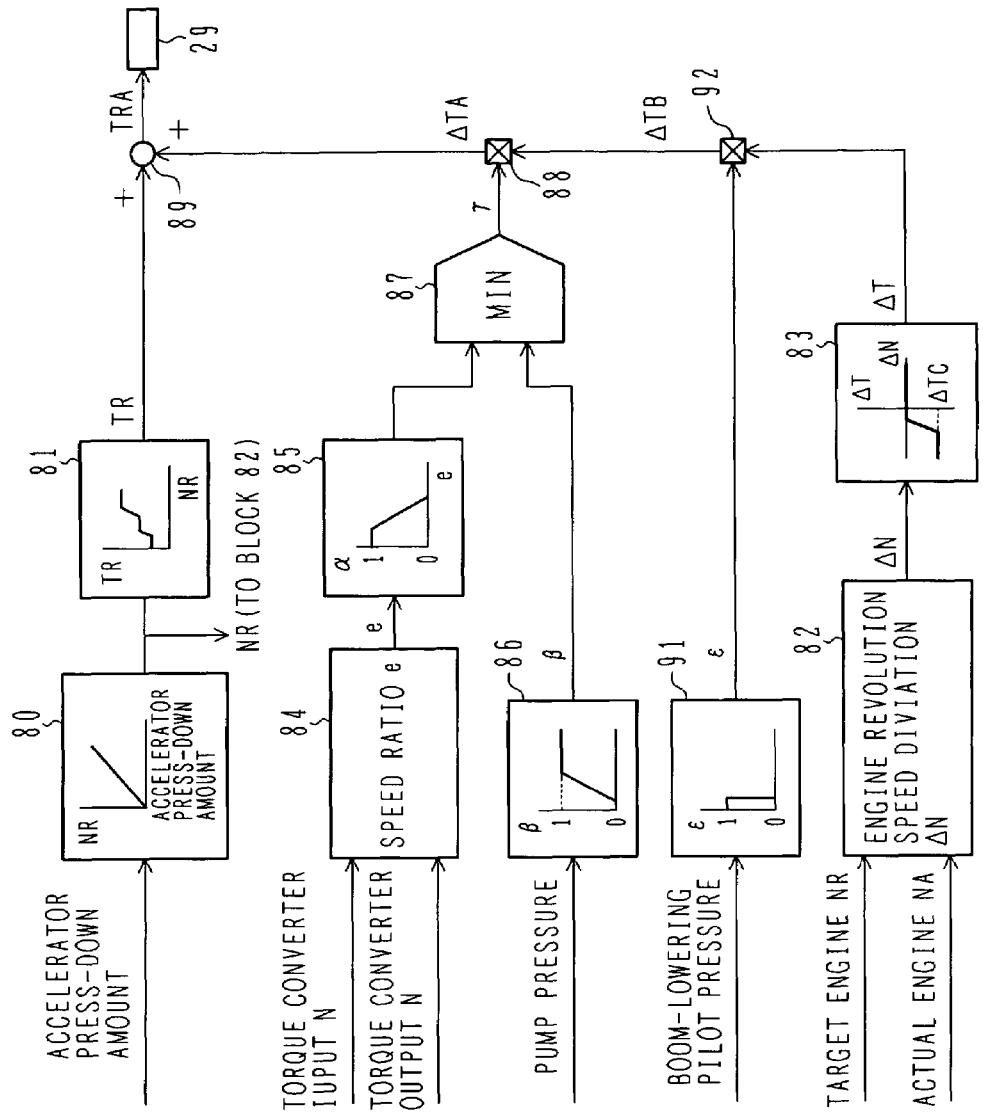
FIG. 11 is a functional block diagram showing the processing function of a controller in the second embodiment of the present invention.

In FIG. 11, the controller 48A has, in addition to the functions shown in FIG. 4, the functions of a second working state determining unit 91 and a multiplier 92.

The second working state determining unit 91 receives a detected signal of the boom-lowering pilot pressure from the pressure sensor 61, and refers to a table, which is stored in a memory, based on the received input, thereby computing a third determination coefficient $\epsilon$ corresponding to the boom-lowering pilot pressure at that time. The third determination coefficient $\epsilon$ is set with intent not to increase the travel force without modifying the maximum pump torque when an operation of lowering the boom is performed (i.e., with the intent to increase the travel force by modifying the maximum pump torque only when the excavation work is performed while the boom is raised). In the table stored in the memory, the relationship between the boom-lowering pilot pressure and the third determination coefficient $\epsilon$ is set such that $\epsilon=1$ is set when the boom-lowering pilot pressure is small, and $\epsilon=0$ is set when the boom-lowering pilot pressure rises to some extent.

The multiplier 92 multiplies the modification torque $\Delta T$ computed by the modification torque computing unit 83 by the third determination coefficient $\epsilon$, thereby providing a modification torque $\Delta TB$. The above-mentioned multiplier 88 multiplies the modification torque $\Delta TB$ by the determination coefficient $\gamma$, thereby providing a modification torque $\Delta TA$.

With this embodiment thus constructed, during the work carried out with the boom lowering operation, the third determination coefficient $\epsilon=0$ is computed and the modification torque $\Delta TB=0$ is resulted. Therefore, the maximum pump torque reducing control is not performed and the travel force is avoided from increasing during the work.

If the front load is increased and the maximum pump torque reducing control is performed in a state where, for example, snow removing work is carried out at a constant speed while lowering the boom, the travel force is increased and the snow removing work cannot be carried out at the constant speed.

In this embodiment, the boom-lowering pilot pressure is detected to determine whether the work carried out at that time is the excavation work or the other type of work. When the boom-lowering pilot pressure is detected, the multiplier 92 computes the modification torque $\Delta TB$ as 0 and makes the maximum pump torque reducing control disabled. As a result, even if the front load is increased in the state where, for example, the snow removing work is carried out at a constant speed while lowering the boom, the travel force is not increased and the snow removing work can be carried out at the constant speed.

With this embodiment, therefore, the maximum pump torque reducing control can be performed while accurately confirming a work situation during the combined operation of the travel and the working actuator. Hence, satisfactory combination in work can be maintained and an improvement of both the workability and the working efficiency can be realized.

Although the foregoing embodiments have been described in connection with the case where the traveling hydraulic working machine is a telescopic handler, similar advantages to those described above can also be obtained with application of the present invention to other types of traveling hydraulic working machines so long as they are equipped with torque converters. Examples of the traveling hydraulic working machine equipped with torque converters, other than the telescopic handler, include a wheel shovel and a wheel loader.

The invention claimed is:

1. A traveling hydraulic working machine comprising at least one prime mover, a machine body mounting said prime mover thereon, traveling means provided in said machine body and including a torque converter coupled to said prime mover, a variable displacement hydraulic pump driven by said prime mover, at least one working actuator operated by a hydraulic fluid from said hydraulic pump, and an operating device for generating an operation signal to control said working actuator, wherein said traveling hydraulic working machine further comprises:

first detecting means for detecting whether the sum of absorption torque of said hydraulic pump and travel torque of said traveling means exceeds output torque of said prime mover;

second detecting means for detecting an operating situation of said traveling means; and pump torque modifying means for modifying maximum absorption torque of said hydraulic pump depending on the operating situation of said traveling means detected by said second detecting means when said first detecting means detects that the sum of the absorption torque of said hydraulic pump and the travel torque exceeds the output torque of said prime mover, wherein said first detecting means produces a modification torque when said first detecting means detects that the sum of the absorption torque of said hydraulic pump and the travel torque exceeds the output torque of said prime mover, and said pump torque modifying means comprises first means for modifying the modification torque depending on the operating situation of said traveling means detected by said second detecting means, and second means for controlling the maximum absorption torque of said hydraulic pump to be reduced by an amount corresponding to the modification torque modified by said second means.

2. The traveling hydraulic working machine according to claim 1, wherein said second detecting means is means for detecting, as the operating situation of said traveling means, an operating situation in which said traveling means requires what magnitude of travel torque, and said first means modifies the modification torque to be reduced or to become 0 when said second detecting means detects that said traveling means is in an operating situation not requiring a relatively large travel torque.

3. The traveling hydraulic working machine according to claim 1, wherein said first means modifies the modification torque to be variably reduced to 0 depending on the magnitude of travel torque required by said traveling means.

4. The traveling hydraulic working machine according to claim 1, wherein said second detecting means includes means for detecting input and output revolution speeds of said torque converter, and means for computing a torque converter speed ratio from the input and output revolution speeds of said torque converter, and said second detecting means detects the operating situation of said traveling means based on the torque converter speed ratio.

5. A traveling hydraulic working machine comprising at least one prime mover, a machine body mounting said prime mover thereon, traveling means provided in said machine body and including a torque converter coupled to said prime mover, a variable displacement hydraulic pump driven by said prime mover, at least one working actuator operated by a hydraulic fluid from said hydraulic pump, and an operating device for generating an operation signal to control said working actuator, wherein said traveling hydraulic working machine further comprises:

first detecting means for detecting whether the sum of absorption torque of said hydraulic pump and travel torque of said traveling means exceeds output torque of said prime mover;

second detecting means for detecting an operating situation of said traveling means;

third detecting means for detecting an operating situation of said traveling means;

pump torque modifying means for modifying maximum absorption torque of said hydraulic pump depending on the operating situation of said traveling means detected by said second detecting means when said first detecting means detects that the sum of the absorption torque of said hydraulic pump and the travel torque exceeds the output torque of said prime mover, wherein said first detecting means produces a modification torque when said first detecting means detects that the sum of the absorption torque of said hydraulic pump and the travel torque exceeds the output torque of said prime mover, and said pump torque modifying means comprises first means for modifying the modification torque depending on the operating situation of said traveling means detected by said second detecting means and the operating situation of said working actuator detected by said third detecting means, and second means for controlling the maximum absorption torque of said hydraulic pump to be reduced by an amount corresponding to the modification torque modified by said second means.

6. The traveling hydraulic working machine according to claim 5, wherein said third detecting means is means for detecting, as the operating situation of said working actuator, an operating situation in which said working actuator requires what magnitude of pump delivery rate, and said first means modifies the modification torque to be reduced or to become 0 when said third detecting means detects that said working actuator is in an operating situation requiring a relatively large pump delivery rate.

7. The traveling hydraulic working machine according to claim 5, wherein said first means modifies the modification torque to be variably reduced to 0 depending on the magnitude of pump delivery rate required by said working actuator.

8. The traveling hydraulic working machine according to claim 5, wherein said third detecting means includes means for detecting the operation signal generated by said operating device and detects the operating situation of said working actuator based on the detected operation signal.

9. The traveling hydraulic working machine according to claim 5, wherein said second detecting means includes means for detecting input and output revolution speeds of said torque converter, and means for computing a torque converter speed ratio from the input and output revolution speeds of said torque converter, and said second detecting means detects the operating situation of said traveling means based on the torque converter speed ratio.

10. A traveling hydraulic working machine comprising at least one prime mover, a machine body mounting said primer mover thereon, traveling means provided in said machine body and including a torque converter coupled to said prime mover, a variable displacement hydraulic pump driven by said prime mover, at least one working actuator operated by a hydraulic fluid from said hydraulic pump, and an operating device for generating an operation signal to control said working actuator, wherein said traveling hydraulic working machine further comprises:
  first detecting means for detecting whether the sum of absorption torque of said hydraulic pump and travel torque of said traveling means exceeds output torque of said prime mover;
  second detecting means for detecting an operating situation of said traveling means; and
  pump torque modifying means for modifying maximum absorption torque of said hydraulic pump depending on the operating situation of said traveling means detected by said second detecting means when said first detecting means detects that the sum of the absorption torque of said hydraulic pump and the travel torque exceeds the output torque of said prime mover, wherein
  said first detecting means is means for detecting whether a deviation between a target revolution speed and an actual revolution speed of said prime mover exceeds a preset value, and whether the sum of the absorption torque of said hydraulic pump and the travel torque of said traveling means exceeds the output torque of said prime mover is detected depending on whether the deviation between the target revolution speed and the actual revolution speed of said prime mover exceeds the preset value.

11. The traveling hydraulic working machine according to claim 10, wherein said second detecting means includes means for detecting input and output revolution speeds of said torque converter, and means for computing a torque converter speed ratio from the input and output revolution speeds of said torque converter, and said second detecting means detects the operating situation of said traveling means based on the torque converter speed ratio.

12. A traveling hydraulic working machine comprising at least one prime mover, a machine body mounting said prime mover thereon, traveling means provided in said machine body and including a torque converter coupled to said prime mover, a variable displacement hydraulic pump driven by said prime mover, at least one working actuator operated by a hydraulic fluid from said hydraulic pump, and an operating device for generating an operation signal to control said working actuator, wherein said traveling hydraulic working machine further comprises:
  first detecting means for detecting whether the sum of absorption torque of said hydraulic pump and travel torque of said traveling means exceeds output torque of said prime mover;
  second detecting means for detecting an operating situation of said traveling means;
  third detecting means for detecting an operating situation of said traveling means;
  pump torque modifying means for modifying maximum absorption torque of said hydraulic pump depending on the operating situation of said traveling means detected by said second detecting means when said first detecting means detects that the sum of the absorption torque of said hydraulic pump and the travel torque exceeds the output torque of said prime mover, wherein
  said third detecting means includes means for detecting one of a delivery pressure of said hydraulic pump and a driving pressure of said working actuator, and said third detecting means detects the operating situation of said working actuator based on the detected pressure.

13. The traveling hydraulic working machine according to claim 12, wherein said second detecting means includes means for detecting input and output revolution speeds of said torque converter, and means for computing a torque converter speed ratio from the input and output revolution speeds of said torque converter, and said second detecting means detects the operating situation of said traveling means based on the torque converter speed ratio.

* * * * *